United States Patent
Rothschild et al.

(10) Patent No.: US 12,373,299 B2
(45) Date of Patent: Jul. 29, 2025

(54) JUST-IN-TIME FILESYSTEM-BASED RANSOMWARE BACKUP

(71) Applicant: Dell Products L.P., Round Rock, TX (US)

(72) Inventors: Seth Jacob Rothschild, Littleton, MA (US); Farida Shafik, Cairo (EG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/159,394

(22) Filed: Jan. 25, 2023

(65) Prior Publication Data

US 2024/0248803 A1    Jul. 25, 2024

(51) Int. Cl.
*G06F 11/14* (2006.01)
*H04L 9/40* (2022.01)

(52) U.S. Cl.
CPC ...... *G06F 11/1451* (2013.01); *G06F 11/1458* (2013.01); *H04L 63/1416* (2013.01)

(58) Field of Classification Search
CPC ............ G06F 11/1451; G06F 11/1458; H04L 63/1416
See application file for complete search history.

(56) References Cited

U.S. PATENT DOCUMENTS

| | | | |
|---|---|---|---|
| 9,317,686 B1* | 4/2016 | Ye | G06F 21/568 |
| 10,122,752 B1* | 11/2018 | Soman | H04L 63/0227 |
| 2017/0180394 A1* | 6/2017 | Crofton | G06F 21/64 |
| 2021/0073407 A1* | 3/2021 | Yu | H04L 9/0618 |

* cited by examiner

*Primary Examiner* — Eric Cardwell
(74) *Attorney, Agent, or Firm* — Workman Nydegger

(57) ABSTRACT

One example method includes detecting a file access process, such as a write operation performed by a ransomware process, directed to a file, based on the detecting, incrementing a counter, checking to determine if the counter exceeds a defined threshold, and when the counter exceeds the defined threshold, creating a backup of the file. The backup file may be a read-only file, and may expire, and be deleted, at a particular time, or after the passage of a period of time.

18 Claims, 3 Drawing Sheets

JUST-IN-TIME FILESYSTEM-BASED RANSOMWARE BACKUP

FIELD OF THE INVENTION

Embodiments of the present invention generally relate to data protection. More particularly, at least some embodiments of the invention relate to systems, hardware, software, computer-readable media, and methods, for protecting data against ransomware.

BACKGROUND

Ransomware is a type of malware attack that infects a computer, such as through a vulnerability or social engineering attacks. The ransomware encrypts the data on the computer, and then proceeds to demand a "ransom" in order to decrypt the encrypted data. The attack exploits the need of the user for the data, incentivizing the user to pay the money to regain access to their data.

Ransomware attacks are also becoming easier to perform. A malicious actor does not need extensive technical experience to build the ransomware and launch it against the victim. Ransomware can also be fast, encrypting only a portion of the file to render the entire file unreadable. Additionally, as methods for ransomware become more capable, authors of ransomware develop ways of evading detection, resulting in a game of cat and mouse.

Keeping regular back ups of data is a tried-and-tested method of immunization against data loss. However, it is difficult, expensive, and time consuming to back up all the user data frequently, so users and even well intentioned organizations might not back up frequently enough to prevent ransomware disaster.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
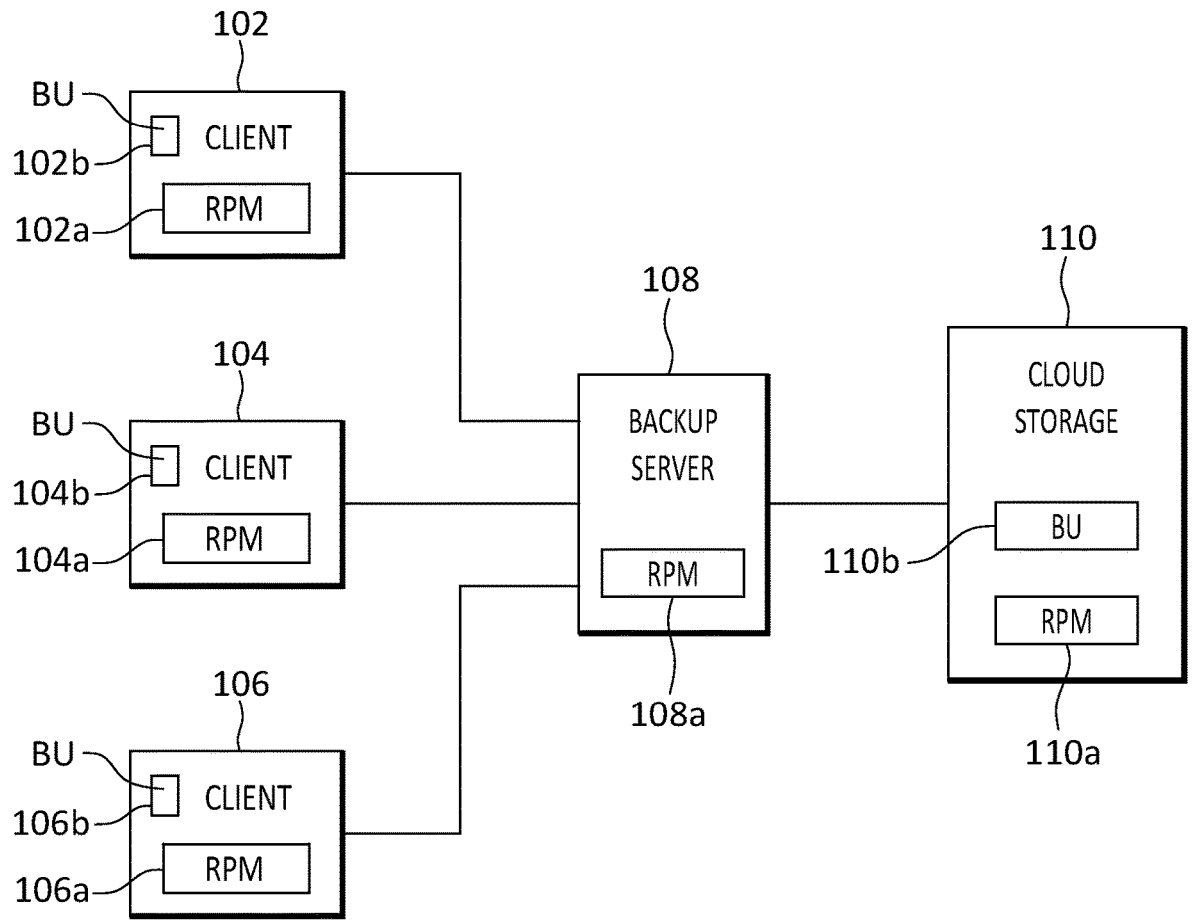
FIG. 1 discloses aspects of an example operating environment and architecture according to one embodiment.

Embodiments of the present invention generally relate to data protection. More particularly, at least some embodiments of the invention relate to systems, hardware, software, computer-readable media, and methods, for protecting data against ransomware.

Ransomware is an attack in which malicious software infects a target computer and encrypts all the files on it. Ransomware mitigation is difficult, and many approaches exist that try to detect various attacks or pre-emptively backup all files. In general then, an embodiment of the invention may comprise a method that creates backups of files as a suspected ransomware attack may be occurring. This approach may avoid the planning and cost that are typically associated with frequent backups, and possibly avoid the negative impacts that may results from a predictive method which incorrectly assesses the threat of a given program. In an embodiment, the backups that are created may not only be used to mitigate the effects of a ransomware attack, but may also be used as honeypots, where any write action directed to such backups may be assumed to be malicious, and may trigger the performance of additional actions and protections to stop an attack.

In more detail, an embodiment of the invention may serve to meet organizations where they are, by implementing reactive ransomware mitigation. Given the reactive security position that most organizations take, in which the organization put protocols in place only after a breach/attack has occurred, an embodiment of the invention may aim to align better with that mindset by enabling the organization to spend money on temporary backups only when it might be necessary. Whenever a file-intensive process is detected, such as a ransomware process for example, in which a significant number of file scans and file writes are occurring, an embodiment may copy accessed files, that is the files to which the writes are being directed, into read-only files before allowing ordinary access. If the backups are inappropriately accessed, such as by an attacker attempting to encrypt the backups, automatic actions may be triggered in response. For example, an attempt to write to a backup may trigger transmission of a notification to an administrator, or may trigger something more draconian, such as as disconnecting the computer, holding the data under attack, from the network, or shutting down the OS to preserve the unencrypted files. Note that an embodiment of the invention need not impair ordinary use of the data, but may still provide assurance that the user will not have to pay to decrypt their own files.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment of the invention may avoid the need to keep relatively recent backups of all files. As another example, an embodiment may use backups to detect malicious activity. An embodiment may detect activity that appears to be malicious and then trigger a response before the attack can be completed. Various other advantages of some example embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context for Some Example Embodiments

Conventional approaches to ransomware protection tend to place significant weight on processes for attack detection, using data analytics and machine learning methods to detect unusual behavior and then flag that behavior. Such approaches may be expensive however, at least in terms of computational and implementation complexity, as well as tending to generate false positives and, worse, false-negatives. Instead of observability-based enforcement such as the examples just mentioned, one embodiment of the invention provide observability-based mitigation.

An embodiment of the invention may be germane to, and comprise, concepts such as, but not limited to, taking backups, taking automatic backups when a ransomware attack is suspected, and cloud storage of data. An embodiment may implement "just-in-time" data backup generation for processes determined to be suspicious and which may constitute ransomware attacks. While storage is generally inexpensive, keeping up-to-date backups of important files can quickly become expensive depending on the number of copies created, and the frequency of the backup. An embodiment of the invention may be relatively more expensive than taking no action at all, but less expensive than taking a conventional approach of keeping multiple copies of all files. An embodiment of the invention may comprise the definition of filesystems in a user space, and enabling action-specific hooks to be written, and custom actions taken while a change, such as an attack on data, is being attempted.

B. Features of Some Example Embodiments

An embodiment of the invention may reduce, or eliminate, the need to keep up to date backups of files. This may be a particularly useful feature, as frequently backing up all files is a non-trivial process. While data storage is generally inexpensive, the required storage to keep multiple copies of large filesystems may be quite expensive. Keeping completely up to date copies of those files can also use an excessive amount of compute and network resources.

As another example, an embodiment may comprise methods and mechanisms to thwart, or at least mitigate, ransomware attacks on backups. A ransomware attack can explicitly target backup files, but can also passively attack many cloud-storage solutions. If a cloud storage service automatically copies all of user files when they change, then the cloud storage system will also back up an encrypted version of the file, created by a ransomware attack for example, and overwrite a useful, that is, unencrypted, version of the file. While this problem might be mitigated to some extent by storing old copies, such an approach would increase the amount of storage needed and, correspondingly, the cost of the storage.

In a further example, an embodiment may comprise methods and mechanisms for detecting suspicious processes. Ransomware may be difficult to detect, as there are many legitimate uses of computer operations that are read-intensive, write-intensive, and compute-intensive. While it may be possible to track particular attack patterns, or to try to predict an attack with ML (machine learning), such approaches can easily lead to false-positives and false-negatives, both of which may be problematic.

An embodiment may avoid the need to throttle ransomware. Due to the similarity between ransomware and legitimate file-intensive user processes, such as downloads, throttling ransomware could lead to a significantly degraded experience for the legitimate processes, since the system may not be able to readily distinguish between legitimate processes and ransomware processes. Additionally, some versions of ransomware may be quite efficient. One example of such ransomware is Lockbit 2.0, which encrypts only 4 KB of each file to render the file unusable.

In a final illustrative example, an embodiment may comprise a method that creates backups only when the backups are determined to be needed, or possibly needed. While ransomware could be detected before completion of full system encryption due to the intensive file I/O operations, a significant portion of the data might already have been encrypted by then. While frequent backups may help to avoid this problem, such an approach has some significant shortcomings, as noted earlier herein. Thus, an embodiment may strike a reasonable middle ground by just watching processes run and creating backups once, and only if, a process has been sufficiently active. In one embodiment, such an approach may result in some data loss, but significantly less data loss than a user that does not have a recent backup and has not employed an embodiment of the invention.

C. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment. New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud environments, which may or may not be public, include data storage environments that may provide data protection functionality for one or more clients. Another example of a cloud environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. As used herein, the term 'backup' is intended to be broad in scope. As such, example backups in connection with which embodiments of the invention may be employed include, but are not limited to, full backups, partial backups, clones, snapshots, and incremental or differential backups.

Example embodiments of the invention are applicable to any system capable of creating, storing, and handling, various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

With particular attention now to FIG. 1, one example of an operating environment for embodiments of the invention is denoted generally at 100. In general, the operating environment 100 may include one or more clients 102, 104, and 106 that may operate to create new and/or modified data that may require protection from ransomware attacks, and other threats. In an embodiment, one or more of the clients 102, 104, and 106, may comprise respective local instances of a ransomware protection module (RPM) 102a, 104a, and 106a. In an embodiment, one or more of the clients 102, 104, and 106, may comprise respective local backups 102b, 104b, and 106b, of the data generated at the clients.

The operating environment 100 may comprise a backup server 108 that may cooperate with the clients 102, 104, and 106, to create backups of the data created by the clients 102, 104, and 106. In an embodiment, the backup server 108 may comprise an RPM 108a. Backups created by the backup server 108 may be stored at the clients 102, 104, and 106, and/or at another storage site, such as a cloud storage site 110. Particularly, the cloud storage site 110 may include an RPM 110a, and may store one or more backups 110b.

Note that the various example embodiments of methods for addressing actual and/or suspected ransomware attacks may, in general, be employed at any system, computer, or site, that stores data. An embodiment may be employed at any site where IOs (input/output operations) directed to data can be observed, accessed, and/or, counted. The data to be protected need not be backup data, but may additionally, or alternatively, comprise production data, such as may be created by clients for example. As well, any system, computer, or site, may store data backups such as may be created by one or more embodiments of the invention. Thus, the examples presented in FIG. 1 are presented solely by way of illustration, and are not intended to limit the scope of the invention in any way.

D. Example Methods

Figure 2:
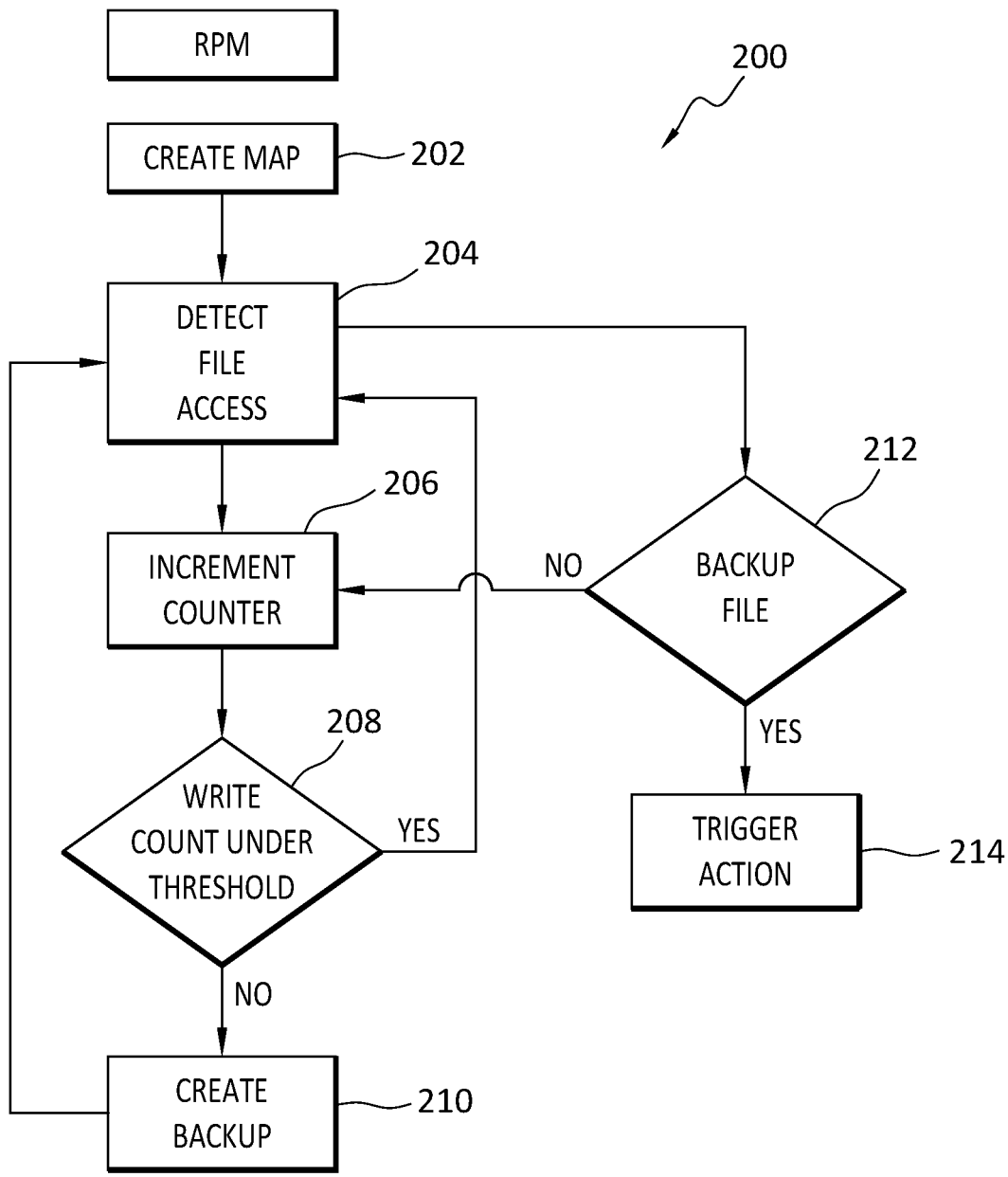
FIG. 2 discloses aspects of an example method according to one embodiment.

It is noted with respect to the disclosed methods, including the example method of FIG. 2, that any operation(s) of any of these methods may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, a method according to one example embodiment is generally denoted at 200. Part, or all, of the method 200 may be performed by, and/or at the direction of, an RPM. Examples of an RPM are disclosed herein in connection with the discussion of FIG. 1.

Initially, a map may be created 202 that may correspond to a particular file. The creation of the map 202 may comprise for example, initializing an empty object. A key may be added to, or included in, the object so that writes, and/or attempted write, to the file may be incremented. The map may include one or more unique process IDs that may each identify a respective process, such as a write operation for example, that may be associated with the file.

At some point after the map is created 202, a file access operation may be detected 204. The file access operation may comprise an IO such as a write operation, or an attempted write operation, for example. The write operation may be a legitimate write operation, or may be a write operation attempted by, or successfully performed by, a ransomware process. In any case, as or after the file access process opens the file to perform the write operation, the corresponding ID, that is, the ID corresponding to the detected process, in the map may be incremented 206.

A check 208 may then be performed of the map to determine if the process write count is under a defined threshold. The threshold may defined, for example, by an administrator, and may be defined based on information about the performance of ransomware attacks. For example, if it is known that a ransomware attack typically comprises at least 'X' process writes, the threshold may be defined as being any integer equal to or greater than 'X.' The threshold may additionally, or alternatively, comprise a temporal element. For example, the check 208 may determine if a threshold number 'Y' of process writes have occurred within a specified time period 'T.' That is, the threshold may comprise a rate at which process writes are performed. Thus, an embodiment may detect when the process writes to a file began, and how quickly, or the rate at which, the process writes were performed. For example, an embodiment may determine how many process writes have been performed in a particular 30 minute time period. As these examples illustrate, a 'threshold' as used herein may embrace various different criteria for evaluating processes, including legitimate processes and ransomware processes, that may be directed to a file.

With continued reference now to the example of FIG. 2, if the check 208 indicates that the process write count has not exceeded the threshold, the process may return to 204. On the other hand, if the check 208 indicates that the process write count has exceeded the threshold, then a backup, which may be a read-only backup, may be created 210 of the file to which the writes were directed. In an embodiment, the backup may be assigned a filename that includes an extension, such as .backup, identifying the backup as such. After the backup of the file has been created 210, the process may return to 204. Thus, in an embodiment, both files, and backups of those files, may be monitored for process writes, or attempted process writes, and/or other IOs. By backing up a file if, and only if, a defined process threshold has been reached, an embodiment may apply some intelligence to the performance of backups, only backing up files when there is an indication, such as the meeting of a threshold, of a possible need to do so.

In order to preserve the backups from being encrypted by a ransomware process, when a write operation is detected 204, the name of the file may be checked 212 to determine if the file is a backup file, such as by checking to determine if the file name contains a .backup extension. If the file is determined to be a backup, one or more actions may then be triggered 214 by that determination. For example, the write operation that is being attempted may be shut down, an administrator may be notified of the write process, or the machine where the process is occurring may be shut down.

A backup, such as the backup created 210 in the method 200, may have a specified duration, or expiration time. In an embodiment, when the backup reaches a pre-configured backup duration, the backup file may be automatically deleted without auto-activating any additional notifications, process killing, or other actions. This may be an important consideration, since if an attack happens without detection and the backups expire, a data loss may result. That is, if the backup of the unencrypted file has expired, and the file itself has become encrypted, the file contents are effectively lost. Thus, an embodiment of the invention may comprise one or more additional methods of detecting attacks, such as checking periodically if a file is completely filled with garbage for example, which may automatically prompt the system to extend the backup duration or expiration time, or to recover a file from a backup of the file.

Note that the write threshold, an example of which is employed at 208 in the method 200, and backup duration may be implementation specific. While a short backup duration may help a user looking for the most recent possible backup, the short backup duration may also shorten the amount of time available to the user to notice an attack before the data is potentially lost. As an example, if the backup duration is set to five minutes, a ransomware attack with a write count that passes a threshold may be mitigated, but only if the system notices the attack and restores the file from the backup within those five minutes. Thus, an embodiment may comprise various detection methods, and may employ a backup duration of suitable length to enable data recovery when an attack is detected, or at least suspected.

E. Further Discussion

As will be apparent from this disclosure, example embodiments of the invention may possess various useful features and aspects. A non-exhaustive list of examples of such features and aspects is set forth below.

For example, an embodiment may comprise a system configured and operable to detect when a certain process, such as Python for example, has performed a number of write operations exceeding a defined threshold for one or more files, and to back up all new files that the process opens, or attempts to open. Thus, an embodiment may be relatively less expensive, in terms of time, financial cost, and/or, computing resources, to implement than an approach that keeps recent backups of all files. Further, an embodiment may operate in such a way that it does not impact normal computer operations in any case where false-positive or false negative ransomware detections occur.

As another example, an embodiment may employ created backups to detect malicious activity. Due to the read-only nature of a backup according to one embodiment, a process attempting to write to that backup would either be erroneous or malicious and, in either case, may be terminated, and may trigger the performance of additional actions. Thus, such a backup may serve as a 'honeypot' to entice a malicious actor, who may then take an action that could be detected, and thwarted.

In a further example, an embodiment may comprise, and/or interact with, a variety of ransomware attack detection methods and an embodiment may restore data, such as one or more files for example, from one or more backups. If an attack is detected by another system, that is, a system other than those disclosed, an embodiment of the invention may extend the backup duration and restore files from their backup. As an example, if file.txt has been encrypted, an embodiment may make a copy of the file, such as file.txt-.backup, and then overwrite the encrypted file.txt, with the contents of the file copy. An embodiment may implement these processes before the expiration of the backup file.txt-.backup.

Another example of a feature and aspect of an embodiment of the invention is a system operable to backup all files touched by a certain process. In particular, an embodiment may operate to backup all files touched by processes of a certain language, such as Python for example. Thus, an embodiment may, instead of waiting for a certain IO threshold to act, act by default based on detection of one or more known frequently used attack vectors.

As another example, an embodiment may comprise a system configured and operable to temporarily back up files to the cloud when needed. This just-in-time temporary back up approach may decrease the cost associated with taking and storing back ups that are never used, by backing files up only when harm, or potential harm, is suspected. At the same time, the backups may be removed after a specific period, such as a defined backup duration, if no attack occurred and the changes to the file were determined to be made by a legitimate actor.

As a final example of a feature and aspect of an embodiment of the invention, an embodiment may create and use ransomware-protected directories. Not all directories are the same, and there are some file writes that may not be as important as other files. By way of illustration, while the contents of /usr/bin may be easily recovered from a network such as the internet, the contents of /home/seth/personal files/ might not be so easily recovered, if recoverable at all. Thus, an embodiment of the invention may operate to protect only certain directories, such as /home/seth/personal files/ in the preceding example, using just-in-time backups.

F. Further Example Embodiments

Following are some further example embodiments of the invention. These are presented only by way of example and are not intended to limit the scope of the invention in any way.

Embodiment 1. A method, comprising: detecting a file access process directed to a file; based on the detecting, incrementing a counter; checking to determine if the counter exceeds a defined threshold; and when the counter exceeds the defined threshold, creating a backup of the file.

Embodiment 2. The method as recited in any preceding embodiment, wherein the file access process comprises a write operation.

Embodiment 3. The method as recited in any preceding embodiment, wherein a possible ransomware attack is indicated by the counter exceeding the defined threshold.

Embodiment 4. The method as recited in any preceding embodiment, wherein the file is only backed up when the counter exceeds the defined threshold.

Embodiment 5. The method as recited in any preceding embodiment, wherein the backup automatically expires, and is deleted, at a particular time, or after a particular period of time has passed.

Embodiment 6. The method as recited in any preceding embodiment, wherein the backup comprises a read-only backup.

Embodiment 7. The method as recited in any preceding embodiment, wherein when another file access process is detected that is directed to the backup, an action is automatically triggered.

Embodiment 8. The method as recited in any preceding embodiment, wherein the backup is used to overwrite the file when part of the file is encrypted by a ransomware process.

Embodiment 9. The method as recited in any preceding embodiment, when part of the file is encrypted by a ransomware process, the file is restored using the backup.

Embodiment 10. The method as recited in any preceding embodiment, wherein the file access process corresponds to a process ID in a map, and the counter comprises the process ID.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
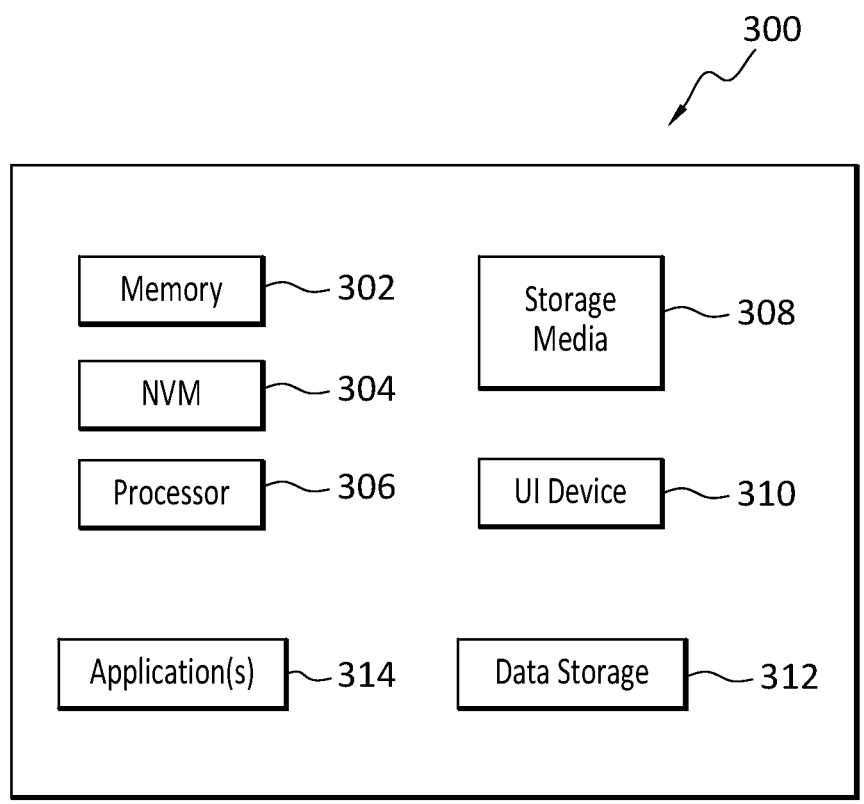
FIG. 3 discloses aspects of an example computing entity operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 316 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   detecting a file access process directed to a file;
   in a case where the file access process is detected, checking a name of the file to determine whether the file is a backup file;
   in a case where it is determined that the file is the backup file, shutting down the file access process; and
   in a case where it is determined that the file is not the backup file:
      based on the detecting, incrementing a counter each time the file access process is detected;
      checking to determine if the counter exceeds a defined threshold; and
      when the counter exceeds the defined threshold, creating a backup of the file,
   wherein, in a case where the file is determined to be the backup file, an administrator is notified of the file access, or a machine where the file access is occurring is shut down.

2. The method as recited in claim 1, wherein the file access process comprises a write operation.

3. The method as recited in claim 1, wherein a possible ransomware attack is indicated by the counter exceeding the defined threshold.

4. The method as recited in claim 1, wherein the file is only backed up when the counter exceeds the defined threshold.

5. The method as recited in claim 1, wherein the backup automatically expires, and is deleted, at a particular time, or after a particular period of time has passed.

6. The method as recited in claim 1, wherein the defined threshold comprises a rate at which the file access process and one or more additional file access processes, collectively, are performed.

7. The method as recited in claim 1, wherein the backup is used to overwrite the file when part of the file is encrypted by a ransomware process.

8. The method as recited in claim 1, wherein when part of the file is encrypted by a ransomware process, the file is restored using the backup.

9. The method as recited in claim 1, wherein the file access process corresponds to a process ID in a map, and the counter comprises the process ID.

10. A non-transitory storage medium having stored therein instructions that are executable by one or more hardware processors to perform operations comprising:
    detecting a file access process directed to a file;
    in a case where the file access process is detected, checking a name of the file to determine whether the file is a backup file;
    in a case where it is determined that the file is the backup file, shutting down the file access process; and
    in a case where it is determined that the file is not the backup file:
       based on the detecting, incrementing a counter each time the file access process is detected;
       checking to determine if the counter exceeds a defined threshold; and
       when the counter exceeds the defined threshold, creating a backup of the file,
    wherein, in a case where the file is determined to be the backup file, an administrator is notified of the one file access, or a machine where the one file access is occurring is shut down.

11. The non-transitory storage medium as recited in claim 10, wherein the file access process comprises a write operation.

12. The non-transitory storage medium as recited in claim 10, wherein a possible ransomware attack is indicated by the counter exceeding the defined threshold.

13. The non-transitory storage medium as recited in claim 10, wherein the file is only backed up when the counter exceeds the defined threshold.

14. The non-transitory storage medium as recited in claim 10, wherein the backup automatically expires, and is deleted, at a particular time, or after a particular period of time has passed.

15. The non-transitory storage medium as recited in claim 10, wherein after the backup of the file is created, both the file and the backup of the file are monitored for file access processes.

16. The non-transitory storage medium as recited in claim 10, wherein the backup is used to overwrite the file when part of the file is encrypted by a ransomware process.

17. The non-transitory storage medium as recited in claim 10, wherein when part of the file is encrypted by a ransomware process, the file is restored using the backup.

18. The non-transitory storage medium as recited in claim 10, wherein the file access process corresponds to a process ID in a map, and the counter comprises the process ID.

* * * * *